(12) United States Patent
Edwards et al.

(10) Patent No.: US 11,100,475 B2
(45) Date of Patent: *Aug. 24, 2021

(54) DOCUMENT TRACKING AND CORRELATION

(71) Applicant: Capital One Services, LLC, McLean, VA (US)

(72) Inventors: Joshua Edwards, Philadelphia, PA (US); Gaurang Bhatt, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,210

(22) Filed: Apr. 21, 2020

(65) Prior Publication Data

US 2020/0250631 A1   Aug. 6, 2020

Related U.S. Application Data

(63) Continuation of application No. 16/189,734, filed on Nov. 13, 2018, now Pat. No. 10,650,358.

(51) Int. Cl.
*G06Q 20/04* (2012.01)
*G06Q 30/00* (2012.01)
(Continued)

(52) U.S. Cl.
CPC .......... *G06Q 20/047* (2020.05); *G06F 40/30* (2020.01); *G06K 9/00463* (2013.01);
(Continued)

(58) Field of Classification Search
CPC ............ G06Q 20/047; G06Q 20/0457; G06Q 30/012; G06Q 30/00; G06Q 30/014;
(Continued)

(56) References Cited

U.S. PATENT DOCUMENTS 7,783,515 B1   8/2010   Kumar et al.
8,682,907 B1   3/2014   Yang et al.
(Continued)

OTHER PUBLICATIONS

Alex Yue; Automated Receipt Image Identification, Cropping, and Parsing (Year: 2018).*

(Continued)

*Primary Examiner* — Florian M Zeender
*Assistant Examiner* — Nicole Elena Bruner
(74) *Attorney, Agent, or Firm* — Harrity & Harrity, LLP

(57) ABSTRACT

A device receives receipt data of a receipt of a transaction for a product, and processes, using a term matching technique, the receipt data to identify transaction information including a transaction date and product information. The device determines that the transaction caused a user to be covered by or eligible for a warranty for the product, generates a tag identifying the product, and associates, using a data structure, the product information, data identifying the warranty, and the tag with a record of the transaction that is accessible via a program that allows the user to search for the receipt or terms of the warranty. The device performs actions associated with assisting the user in managing the warranty, such as by reminding the user of an expiration date of the warranty and/or by assisting the user in submitting a claim based on the warranty.

20 Claims, 10 Drawing Sheets

(51) Int. Cl.
  *G06K 9/00* (2006.01)
  *G06F 40/30* (2020.01)
  *G06N 20/00* (2019.01)

(52) U.S. Cl.
  CPC ......... *G06N 20/00* (2019.01); *G06Q 20/0457* (2013.01); *G06Q 30/012* (2013.01); *G06K 2209/01* (2013.01); *G06Q 30/00* (2013.01); *G06Q 30/014* (2013.01); *G06Q 30/016* (2013.01)

(58) Field of Classification Search
  CPC ...... G06Q 30/016; G06N 20/00; G06F 40/30; G06K 9/00463; G06K 2209/01
  USPC .......................................................... 705/24
  See application file for complete search history.

(56) References Cited

U.S. PATENT DOCUMENTS

| | | | |
|---|---|---|---|
| 9,760,871 B1* | 9/2017 | Pourfallah | G06Q 20/3276 |
| 10,127,591 B1 | 11/2018 | Wollmer et al. | |
| 2002/0188561 A1 | 12/2002 | Schultz et al. | |
| 2005/0131768 A1 | 6/2005 | Rodriguez et al. | |
| 2006/0184379 A1* | 8/2006 | Tan | G06Q 30/02 |
| | | | 705/302 |
| 2010/0114654 A1 | 5/2010 | Lukose et al. | |
| 2010/0257066 A1 | 10/2010 | Jones et al. | |
| 2010/0331043 A1 | 12/2010 | Chapman et al. | |
| 2011/0078487 A1 | 3/2011 | Nielsen et al. | |
| 2012/0330971 A1 | 12/2012 | Thomas et al. | |
| 2014/0074675 A1 | 3/2014 | Calman et al. | |
| 2014/0136423 A1 | 5/2014 | Moreton | |
| 2015/0032638 A1 | 1/2015 | Dintenfass et al. | |
| 2017/0186017 A1 | 6/2017 | High et al. | |
| 2018/0268418 A1* | 9/2018 | Tanksali | G06Q 20/401 |
| 2019/0287117 A1 | 9/2019 | Danyluk et al. | |

OTHER PUBLICATIONS

Co-pending U.S. Appl. No. 16/189,734, filed Nov. 13, 2018.

Intuit Inc., "Smarter Business Tools for the World's Hardest Workers," https://search2.quickbooks.com/getquickbooks/?cid=ppc_G_e_US_GGL_Brand_Top+Terms_Exact_Search_Desktop_E2EC_quickbooks_txt&gclid=EAiaiQobChMioNa91Kux3giVIQOGCh20PwiCEAAYASAAEgJCQ_D_BwE&gclsrc=aw.ds%20-%20/#/, Oct. 31, 2018 (print date), 7 pages.

Neuberg B., "Creating a Modern OCR Pipeline Using Computer Vision and Deep Learning," https://blogs.dropbox.com/tech/2017/04/creating-a-modern-ocr-pipeline-using-computer-visionand-deep-learning/, Apr. 12, 2017, 21 pages.

* cited by examiner

DOCUMENT TRACKING AND CORRELATION

RELATED APPLICATION

This application is a continuation of U.S. patent application Ser. No. 16/189,734, filed Nov. 13, 2018, which is incorporated herein by reference.

BACKGROUND

A receipt is a document acknowledging that a transaction was made between two or more parties. Situations often arise in which a purchaser of a product requires a copy of a receipt, but is unable to find the receipt, or finds the receipt but is unable to identify a corresponding product.

SUMMARY

According to some example implementations, a method may include receiving, by a device, receipt data of a receipt of a transaction for one or more products. The method may include processing, by using a term matching technique, the receipt data of the receipt to identify transaction information for the transaction. The transaction information may include a transaction date and product information for the one or more products. The method may include determining that a product of the one or more products is associated with a warranty. The method may include identifying one or more terms of the warranty for the product, and generating a set of tags identifying the one or more products. The method may include associating the transaction information, the one or more terms of the warranty, and the set of tags with a record of the transaction. The record of the transaction may be accessible via a program that includes a search feature that allows the user to search for the receipt or for the one or more terms of the warranty. The method may include performing one or more actions associated with assisting a user in managing the warranty. The one or more actions may include at least one of: a first group of one or more actions associated with reminding the user of an expiration date of the warranty, a second group of one or more actions associated with assisting the user in submitting a claim based on the warranty, or a third group of actions associated with assisting the user in renewing the warranty.

According to some example implementations, a device may include one or more memories, and one or more processors, operatively coupled to the one or more memories, to receive receipt data of a receipt of a transaction for one or more products. The one or more processors may process, using a term matching technique, the receipt data of the receipt to identify transaction information for the transaction. The transaction information may include a transaction date and product information for the one or more products. The one or more processors may determine that there is a threshold likelihood that the transaction caused a user to be covered by or eligible for a warranty for a product of the one or more products. The one or more processors may generate a set of tags identifying the one or more products. The one or more processors may associate, using a data structure, the transaction information, data identifying the warranty, and the set of tags with a record of the transaction. The record of the transaction may be accessible via a program that allows the user to search for the receipt or for terms of the warranty. The one or more processors may perform one or more actions associated with assisting the user in managing the warranty. The one or more actions may include a first group of one or more actions associated with reminding the user of an expiration date of the warranty and a second group of one or more actions associated with assisting the user in submitting a claim based on the warranty.

According to some example implementations, a non-transitory computer-readable medium may store instructions that include one or more instructions that, when executed by one or more processors of a device, cause the one or more processors to receive receipt data of a receipt of a transaction for a product, and to process, using one or more term matching techniques, the receipt data to identify transaction information for the transaction. The transaction information may include at least one of: a merchant identifier of a merchant involved in the transaction, a date of the transaction or product information for the product. The one or more instructions may cause the one or more processors to determine that the transaction caused a user involved in the transaction to be covered by or eligible for a warranty for the product and may cause the one or more processors to identify terms of the warranty for the product. The one or more instructions may cause the one or more processors to associate the transaction information, the terms of the warranty, and an electronic copy of the receipt of the transaction with a record of the transaction. The record of the transaction may be accessible via a program that includes a search feature to search for the receipt or for the terms of the warranty. The one or more instructions may cause the one or more processors to perform one or more actions associated with assisting the user in managing the warranty. The one or more actions may include at least one of: a first group of one or more actions associated with reminding the user of an expiration date of the warranty or a second group of one or more actions associated with assisting the user in submitting a claim based on the warranty.

DETAILED DESCRIPTION

Figure 1A:
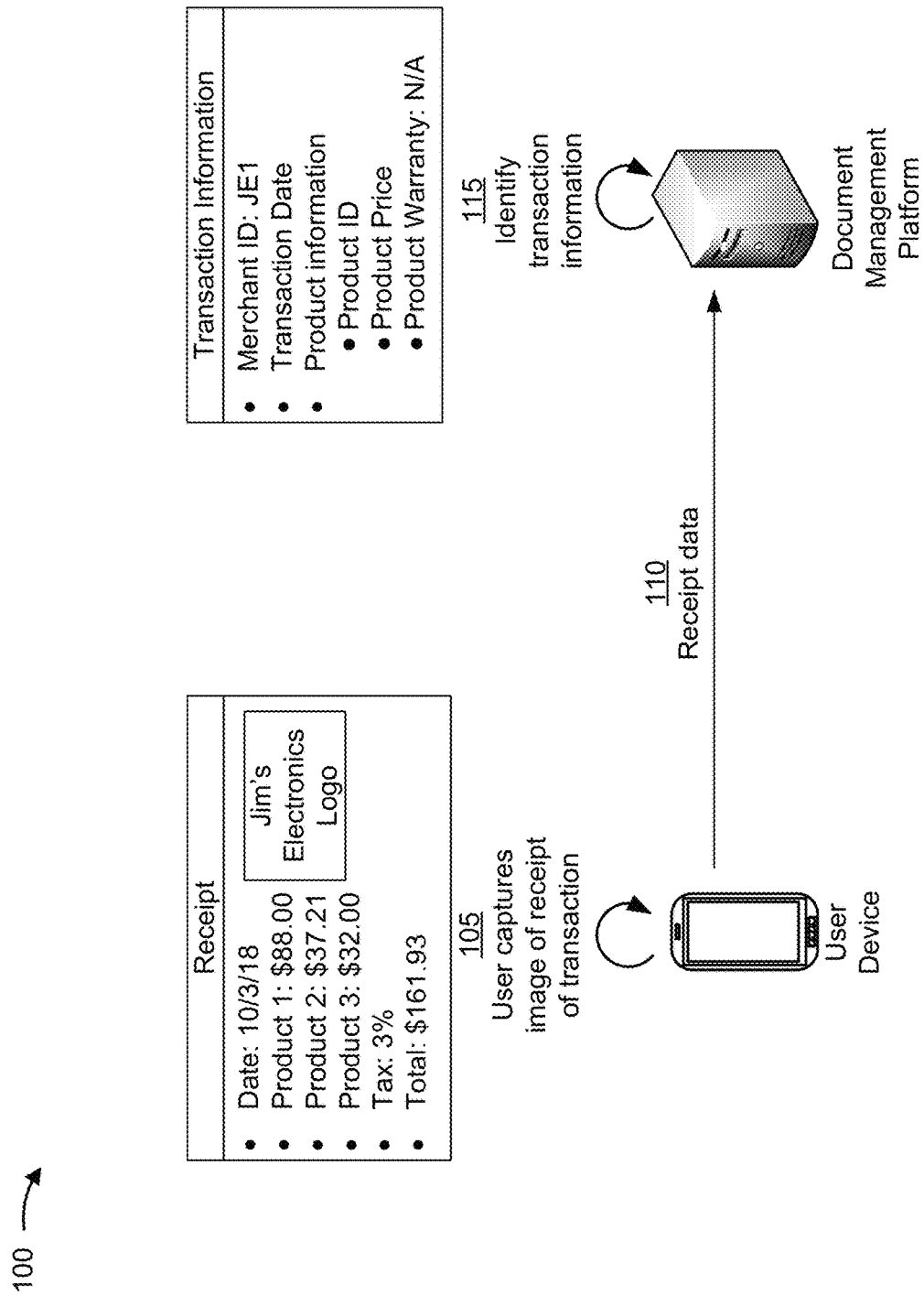
FIGS. 1A-1E are diagrams of an example implementation described herein.

The following detailed description of example implementations refers to the accompanying drawings. The same reference numbers in different drawings may identify the same or similar elements.

When a product is purchased, the purchaser (hereafter, "user") may be provided with a receipt. In some cases, the purchase will include a warranty that includes one or more promises related to the product.

In some cases, the user may be asked to provide a copy of the receipt as proof of warranty and/or proof of whether the warranty is still in effect (e.g., the receipt may identify a date of purchase and/or a date on which the warranty went into effect). If the user does not have the receipt, the user might forget that the product is protected by the warranty, be unable to prove that the product is protected by the warranty, be unable to prove that the warranty is still in effect, and/or the like. When the user submits the claim that the promise of the warranty has not been fulfilled, and is unable to prove the claim, resources (e.g., processing resources, network resources, memory resources, and/or the like) of a device used to submit the claim and/or a system used to process the claim are needlessly wasted by processing the claim for which there is no proof of warranty.

Some implementations described herein provide a document management platform to capture transaction information from receipt data of a receipt of a transaction for a product, to determine that the transaction caused a user to be covered by or eligible for a warranty for the product, and to perform actions associated with assisting the user in managing the warranty. For example, a user may receive a receipt as part of a transaction for a product. In this case, the user may interact with a user device (e.g., a smart phone) to capture an image of the receipt and may provide the image of the receipt to the document management platform (e.g., by uploading the image of the receipt to a program or a web site). Additionally, the document management platform may use a character recognition technique (e.g., an optical character recognition (OCR) technique)) to convert the image to text data. In this case, the document management platform may use a term matching technique to process the text data to identify a date of the transaction, product information for the product, a merchant identifier of a merchant involved in the transaction, and/or the like.

Furthermore, the document management platform may determine that the user was covered by the warranty for the product and may identify terms of the warranty. Additionally, the document management platform may generate a set of tags that allow the user to access a search feature of a program to search for and view the terms of the warranty and/or the transaction information included in the receipt. Moreover, the document management platform may perform one or more actions associated with assisting the user in managing the warranty, such as by providing the user with a reminder of an expiration date of the warranty, assisting the user in submitting a claim that a term of the warranty has not been fulfilled, assisting the user with renewing the warranty, and/or the like.

In this way, the document management platform may help ensure that the user does not forget that the product is protected by the warranty, assists the user in submitting a claim based on the warranty, assists the user in renewing the warranty, and/or the like. This allows the document management platform to reduce or eliminate submission of claims that are unlikely to succeed without the assistance provided by the document management platform (e.g., without proof of warranty), thereby conserving resources (e.g., processing resources, network resources, memory resources, and/or the like) of devices that would otherwise be used to needlessly submit, process, and/or reject those claims.

Additionally, processes described herein save time of the user by reducing or eliminating time spent searching for the receipt, time spent navigating a warranty system to determine terms associated with the warranty or to submit a claim based on the warranty, and/or the like, and save financial resources of the user by ensuring that the warranty is active, that the user is able to make a successful claim based on the warranty, and/or the like. Moreover, the warranty system conserves resources even if the claim submitted by the user is valid because the warranty system would not have to search for and correlate warranty and purchase information of the user.

Furthermore, several different stages of the process for managing the warranty of the product are automated, which may remove human subjectivity and waste from the process, and which may improve speed and efficiency of the process and conserve computing resources (e.g., processor resources, memory resources, and/or the like). For example, in some cases, the document management platform may obtain consent from the user to automatically analyze (e.g., mine) an e-mail account of the user to obtain an electronic copy of the receipt. In this case, the document management platform eliminates a need for the user to provide image data of the receipt, thereby eliminating scenarios where the user forgets to take a photograph of the receipt, where the photograph captured by the user is blurry or unclear, and/or the like, thereby improving quality and efficiency of the process. Additionally, implementations described herein use a rigorous, computerized process to perform tasks or roles that were not previously performed or were previously performed using subjective human intuition or input.

FIGS. 1A-1E are diagrams of an example implementation 100 described herein. For example, example implementation 100 may include a document management platform that interacts with a user device to assist a user with managing a warranty of a product.

As shown in FIG. 1A by reference number 105, the user may use the user device to capture an image of a receipt of a transaction that includes one or more products. For example, the user may use the user device to access a program (e.g., application) or a website with a feature that can capture an image of the receipt of the transaction.

In some implementations, the program may be a warranty management program that is dedicated to managing receipts and warranties of products. In some implementations, the program may be a banking program that provides the user with one or more banking services (e.g., an online banking application). In this case, the feature that can capture the image of the receipt and/or other features relating to managing receipts and warranties may be provided as an extension (e.g., a plug-in) to the banking program. This may permit the user to use the banking program to view a transaction history that includes the transaction, view specific details of the transaction (e.g., product information of a product, etc.), view or download an electronic copy of the receipt of the transaction, view warranty information if one of the products is protected by warranty, and/or the like.

As shown by reference number 110, the user device may provide receipt data for the receipt to the document management platform. For example, the user device may capture the image of the receipt and may provide image data of the receipt to the document management platform (e.g., via an application programming interface (API)). In some cases, the image may be captured using a feature of the program described herein. In other cases, the image may be captured using another program and provided to the document management platform using an API accessible via the program.

Additionally, or alternatively, the user device may provide the document management platform with an electronic copy of the receipt (referred to hereafter as an electronic receipt). For example, if the user completes the transaction and requests that the electronic receipt be provided to an electronic mail (e-mail) account of the user, the user may access the electronic receipt from the e-mail account and may cause the electronic receipt to be provided to the document management platform. In this case, the user may cause the electronic receipt to be provided to the document management platform by transferring the electronic receipt to the program, such as by downloading the electronic receipt from an e-mail and uploading the electronic receipt to the program.

Additionally, or alternatively, the document management platform may automatically obtain the electronic receipt. For example, the user may have provided consent to allow the document management platform to access information stored within an e-mail account of the user. In this case, the document management platform may use a secure access delegation service (e.g., OAuth, etc.) to access a set of e-mails included in the e-mail account of the user and may analyze terms included in the set of e-mails to identify and obtain the electronic receipt of the transaction.

In some implementations, the document management platform may obtain the electronic receipt based on detecting a change to a transaction history of an account of the user. For example, the document management platform may monitor a transaction history associated with an account of the user (e.g., an online banking account), and may, upon identifying a change to the transaction history (e.g., the transaction made by the user may have been added to the transaction history), use the secure access delegation service to obtain a set of e-mails that include the electronic receipt. In this case, the document management platform may search the set of e-mails for the electronic receipt using values identified in the transaction history of the account of the user, such as a product cost, a product name, a merchant name, and/or the like.

In some cases, the document management platform may obtain the electronic receipt based on another trigger. For example, rather than monitoring the transaction history associated with the account of the user, the document management platform may periodically use the secure access delegation service to analyze e-mails to identify an electronic receipt that is included in an e-mail. In some cases, such as when the program is a banking program, the document management platform may scan a transaction history of the user to identify a corresponding transaction, such that the document management platform is able to associate the record of the transaction with the electronic receipt.

By using the secure access delegation service to obtain the electronic receipt, the document management platform conserves resources (e.g., processing resources, network resources, memory resources, and/or the like) and reduces opportunities for human error and waste.

In some implementations, the secure access delegation service may have restricted access to the e-mail account of the user. For example, a special folder may be accessible to the secure access delegation service, while other folders of the e-mail account may be inaccessible. This improves security and protects personal information of the user, while still allowing the document management platform to automate one or more steps of the process of managing receipts and/or warranties for products.

As shown by reference number 115, the document management platform may identify transaction information included in the receipt. For example, the document management platform may use a character recognition technique, a term matching technique (e.g., a technique to compare product identifiers displayed on the receipt to actual product names, a natural language processing technique, etc.), and/or the like, to process the receipt data to identify the transaction information. The transaction information may include product information for one or more products, a transaction date, a merchant identifier of a merchant associated with the transaction, and/or the like. The product information may include a product identifier for a product (e.g., a product name, a product code, and/or the like), a price of the product, and/or the like.

In some implementations, the document management platform may convert the image from image data to text data. For example, assume the document management platform receives the image of the receipt of the transaction. In this case, the document management platform may process the image using the character recognition technique (e.g., an optical character recognition (OCR) technique or a similar technique) to convert the image to a text format that may be further processed to identify the transaction information.

Additionally, or alternatively, the document management platform may identify the transaction information by using a text matching technique that compares the receipt data and data included in a set of templates. For example, the document management platform may store or have access to a set of templates that associate product identifiers that are commonly found in receipts with product names for the products, product types identifying a type of product, and/or the like. In this case, the document management platform may analyze the receipt to identify a set of product identifiers and may reference the set of templates to identify product identifiers that are stored in association with particular product names and/or product types. As an example, the receipt may use a line-by-line itemization approach whereby each line of the receipt represents a different product identifier and price combination. Thereby, the document management platform may analyze each line of the receipt to identify which text values represent product identifiers for the one or more products and which values represent prices for the one or more products. A similar approach may be used to identify a date of the transaction (e.g., by comparing receipt data to a template that includes values commonly found in dates, such as numerical values used in conjunction with dashes or slashes).

Additionally, or alternatively, the document management platform may use a natural language processing technique to identify the transaction information. For example, the document management platform may use a fuzzy matching technique to match a product identifier with a product name or product type in scenarios where the product identifier may only match the product name or product type approximately (rather than exactly). In this case, the document management platform may match a product identifier to a product name or product type using a word distance technique (e.g., a Levenshtein distance technique, a Jaro-Winkler distance technique, etc.), an N-gram technique, and/or the like.

Additionally, or alternatively, the document management platform may use a data mining technique to identify the transaction information. For example, in some cases, a receipt may include a product identifier that is distinct from the name of the product, such that the document management platform may be unable to identify the product by processing the product information included in the receipt. As an example, assume a washing machine is listed on a receipt as WMAV2JDW. In this case, the document management platform may use a data mining technique to analyze a website of a merchant that provided the product to the user to identify a name of the product and/or a product type of the product. For example, the document management platform may analyze the website and determine that product identifiers beginning with WMA are washing machines and that V2JDW is indicative of a second version of a washing machine that was created by the organization John Doe's Washers. Thereby, the document management platform may be able to use the data mining technique to identify the transaction information.

Additionally, or alternatively, the document management platform may identify transaction information using a computer vision technique (e.g., image recognition and matching). For example, in some cases, a receipt might not include text identifying a merchant, but instead may simply include a logo of the merchant. In this case, the document management platform may use the computer vision technique to analyze the logo and determine that the receipt is for a transaction involving a particular merchant.

In some implementations, the document management platform may identify transaction information that includes warranty information of a warranty for a product. For example, if a user paid an additional cost for a warranty, the warranty and its cost may be included in one or more fields of the receipt. This may allow the warranty information to be identified using one or more techniques described herein. In some implementations, the document management platform may need to perform additional actions to determine whether the product is protected by a warranty, whether the user was provided the warranty, and/or the like, as described further herein.

In this way, the document management platform identifies transaction information included in the receipt of the transaction, which may be used for managing a warranty for one of the products, as described further herein.

Figure 1B:
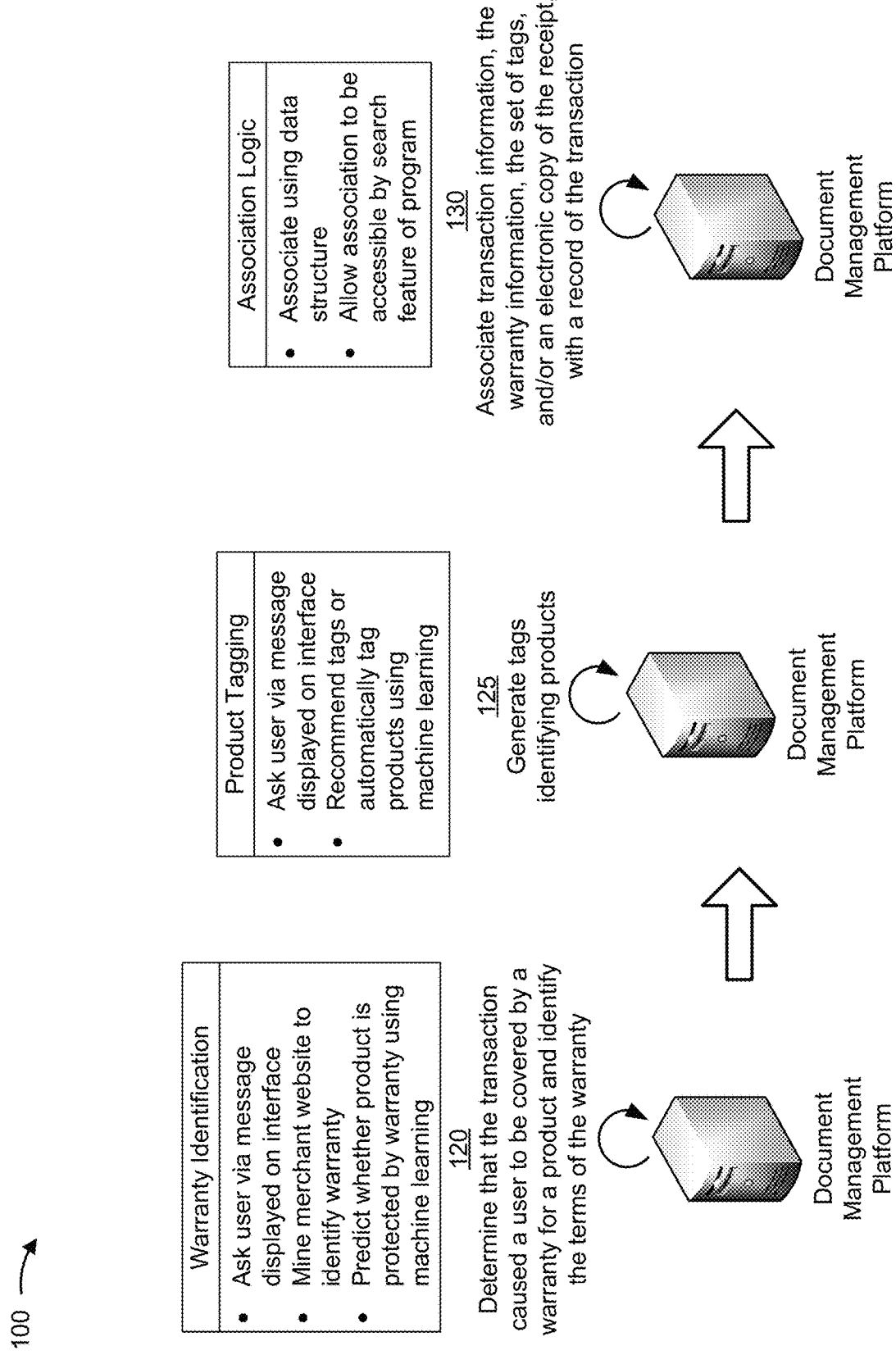

As shown in FIG. 1B by reference number 120, the document management platform may determine that the transaction caused the user to be covered by a warranty for a product and may identify the terms of the warranty. For example, the document management platform may determine that a product, of the one or more products, is protected by warranty, and that engaging in the transaction caused the user to be covered by the warranty or at least eligible to be covered by the warranty.

In some implementations, the document management platform may determine that the user has been covered by a warranty for a product by using an interface of the program to provide the user with warranty questions. For example, the document management platform may provide, for display on an interface of the user device (e.g., as part of the program), a set of warranty questions asking the user whether any of the one or more products is covered by a warranty, asking whether the user explicitly purchased the warranty, asking the user for terms of the warranty (such as length of warranty, defects covered, etc.), and/or the like. In this case, the user may interact with the interface to respond to the warranty questions, which may cause a set of responses to be provided to the document management platform. The document management platform may process the set of responses to determine that the user has purchased a product that is protected by warranty and/or terms of the warranty.

Additionally, or alternatively, the document management platform may use a data mining technique to determine that the transaction caused the user to be covered by a warranty. For example, the document management platform may determine that a product that was part of the transaction automatically is covered by a warranty. In this case, the document management platform may use a merchant identifier found in the receipt to identify a merchant (e.g., a retailer, a manufacturer, etc.) and may identify a website associated with the merchant. Additionally, the document management platform may use the data mining technique and/or a natural language processing technique to analyze the website to identify text indicating that the product is automatically covered by the warranty (e.g., upon purchase), to identify the product in a list of products that are known to be automatically covered by the warranty, and/or the like.

In some implementations, the document management platform may determine that the product is associated with a warranty. For example, the document management platform may determine that the product has a warranty that is available but requires the user to register for or purchase the warranty, that the product has multiple types of warranties available, and/or the like.

In some cases, the document management platform may use one or more techniques described herein to determine that the product is associated with a warranty. For example, the user may be provided with an e-mail indicating that the user is being offered the warranty, is eligible for the warranty, has purchased the warranty, and/or the like. In this case, the document management platform may use the secure access delegation technique to access the e-mail and may analyze terms included in the e-mail to determine that the product is associated with the warranty. To provide a few other examples, the document management platform may determine that the product is associated with the warranty by asking the user (e.g., via a user interface), by receiving and analyzing (e.g., using OCR) an image describing terms the warranty (e.g., which may be provided by the user), by using machine learning to make the determination (e.g., in a manner similar to that described below), and/or the like.

Additionally, or alternatively, the document management platform may use machine learning to determine a likelihood that the user was covered by the warranty for the product. For example, assume the document management platform trained or received a data model that had been trained on historical warranty data. The historical warranty data may include, for a plurality of warranties, products, and transactions, data identifying terms of a warranty for a product, data identifying an expiration of the warranty, data identifying when users purchased or were covered by the warranty, demographic data relating to the users (e.g., an age, a gender, a profession, and/or the like), historical location data of the users, historical product data for the product to which the warranty applies, and/or the like. The data model may use one or more machine learning techniques to determine a likelihood that the user was covered by a warranty for one of the one or more products purchased via the transaction. The one or more machine learning techniques may include a regression technique, a clustering technique, a technique using a decision tree, a technique using a neural network, and/or the like.

In this case, the document management platform may provide the transaction information (and/or an identifier of the user) as input to the data model to cause the data model to output one or more indicator values that may be used to predict whether the user was covered by a warranty. The one or more indicator values may serve as indicators of a confidence level in whether the product is covered by a warranty, a confidence level in a type of warranty associated with the product, a confidence level in the warranty having particular terms, and/or the like. The indicator values may be based on trends and/or patterns identified when the data model was trained. For example, if a product has an optional warranty, but historically 95% of consumers purchase the warranty for the product, or 95% of consumers of a demographic that is similar to a demographic of the user purchase the warranty for the product, the indicator values output by the data model may be used to determine that there is a high likelihood that the user was covered by a warranty for the product.

In some implementations, the document management platform may determine one or more steps to cause the warranty to take effect. For example, the document management platform may use a technique described here (e.g., the secure access delegation technique, the data mining technique, the machine learning technique, and/or the like) to determine the one or more steps that cause the warranty to take effect. To provide a few examples, the document management platform may analyze an e-mail provided to the e-mail account of the user to determine that the user has to visit a registration webpage to sign up for the warranty, to call a 1-800 number to sign up for the warranty, to submit documentation (e.g., a paper document, an electronic document, etc.) to sign up for the warranty, and/or the like.

In some implementations, the document management platform may initiate the one or more steps to cause the warranty to take effect. For example, the document management platform may provide the user with a link to the website to sign up for the warranty (e.g., via e-mail, text message, the program or website that is used to manage the warranty, etc.), may provide the user with the 1-800 number to sign up for the warranty, may provide the user with a blank copy of the document needed to the sign up for the warranty, and/or the like. In some cases, the document management platform may have access to user profile information of the individual and may automatically populate fields of the website that are used to sign up for the warranty, fields of an electronic copy of the document used to sign up for the warranty, and/or the like. In other cases, the document management platform may perform other actions, such as causing a mobile phone of a user to begin dialing the 1-800 number, scheduling a calendar reminder in an electronic calendar of the user to sign up for the warranty before a particular date, and/or the like.

In some implementations, the document management platform may determine the terms of the warranty. For example, the document management platform may determine the terms of the warranty using one or more techniques described above, such as by asking the user, using the data mining technique, using the data model, and/or the like.

In this way, the document management platform determines that the transaction was likely to cause the user to be covered by a warranty and identifies terms that are likely to be part of the warranty.

As shown by reference number 125, the document management platform may generate a set of tags related to the one or more products. For example, the user may be able to use a search feature of the program or the website (e.g., the program or the website described in connection with FIG. 1A) to search for the electronic receipt and/or to view the terms of the warranty. In this case, the document management platform may generate a set of tags that are to serve as search terms for the one or more products and/or the receipt. The set of tags may describe terms or phrases that are commonly input by users, and may include a tag identifying a name of a product, a tag identifying a variant of the name of the product (e.g., a commonly used nickname or shorthand for the product), a tag identifying a category name or genus term for the product, a tag that includes a merchant name and/or a product name, and/or the like.

In some implementations, the document management platform may generate one or more tags by performing a synonym mapping technique. For example, the document management platform may perform a synonym mapping technique that identifies synonyms of the name of the product, a type of product, and/or the like, and may generate one or more tags for the synonyms. In this case, the document management platform may reference a data structure that associates synonyms with product identifiers, products names, product types, and/or the like. The data structure may include a synonym dictionary, a product taxonomy, a knowledge graph, and/or the like.

Additionally, or alternatively, the document management platform may generate one or more tags of variants of search terms by performing another type of natural language processing technique. For example, the document management platform may generate a variant of a search term that incorporates different word tenses or conjugations (e.g., a wash machine, a washing machine, a washer machine, etc.).

Additionally, or alternatively, the document management platform may generate one or more tags using machine learning. For example, the document management platform may train or receive a data model that has been trained on historical search terms data. The historical search terms data may include data identifying historical search terms, data identifying a frequency or degree to which users searched for particular historical search terms, data identifying results of successful searches and/or unsuccessful searches, and/or the like. The data model may be trained via one or more machine learning techniques to predict search terms, variations of search terms, and/or the like. In this case, the document management platform may provide, as input to the data model, the product information for the one or more products (and/or a user identifier), which may cause the data model to output one or more values that may indicate a confidence level in whether a particular search term will be used by the user.

In some implementations, the document management platform may obtain user approval to use a set of tags. For example, the document management platform may generate the set of tags and may provide the set of tags to be displayed as suggested tags via an interface of the program. This may allow the user to approve and/or reject specific tags, such that approved tags may be used as search terms when the user subsequently utilizes the search feature of the program. Additionally, or alternatively, the document management platform may automatically use the set of tags as part of the search feature of the program. In some cases, the document management platform may automatically use a tag or may request approval of the user to use the tag based on whether the tag, which had been generated using machine learning, satisfies a threshold confidence level (e.g., a confidence level that the user is likely to use the tag as a search term).

As shown by reference number 130, the document management platform may associate the transaction information, warranty information for the warranty (e.g., a warranty identifier, the terms of the warranty, etc.), the set of tags, and/or the electronic receipt, with a record of the transaction. For example, to allow the user to utilize the search feature of the program, the document management platform may use a data structure to establish an association between the transaction information, the warranty information, the set of tags, the electronic receipt, and/or a transaction identifier used to create a record of the transaction. In this way, the user may search for the electronic receipt and/or the warranty information using one or more keywords. For example, the document management platform may reference the data structure to identify tags that match or are close to the one or more keywords, and may identify the transaction information, the warranty information, and/or the electronic receipt, that are associated with the tags that have been identified.

In this way, the document management platform establishes associations between information relating to the transaction, such that the information may be used to assist the user in managing the warranty, as described further herein.

Figure 1C:
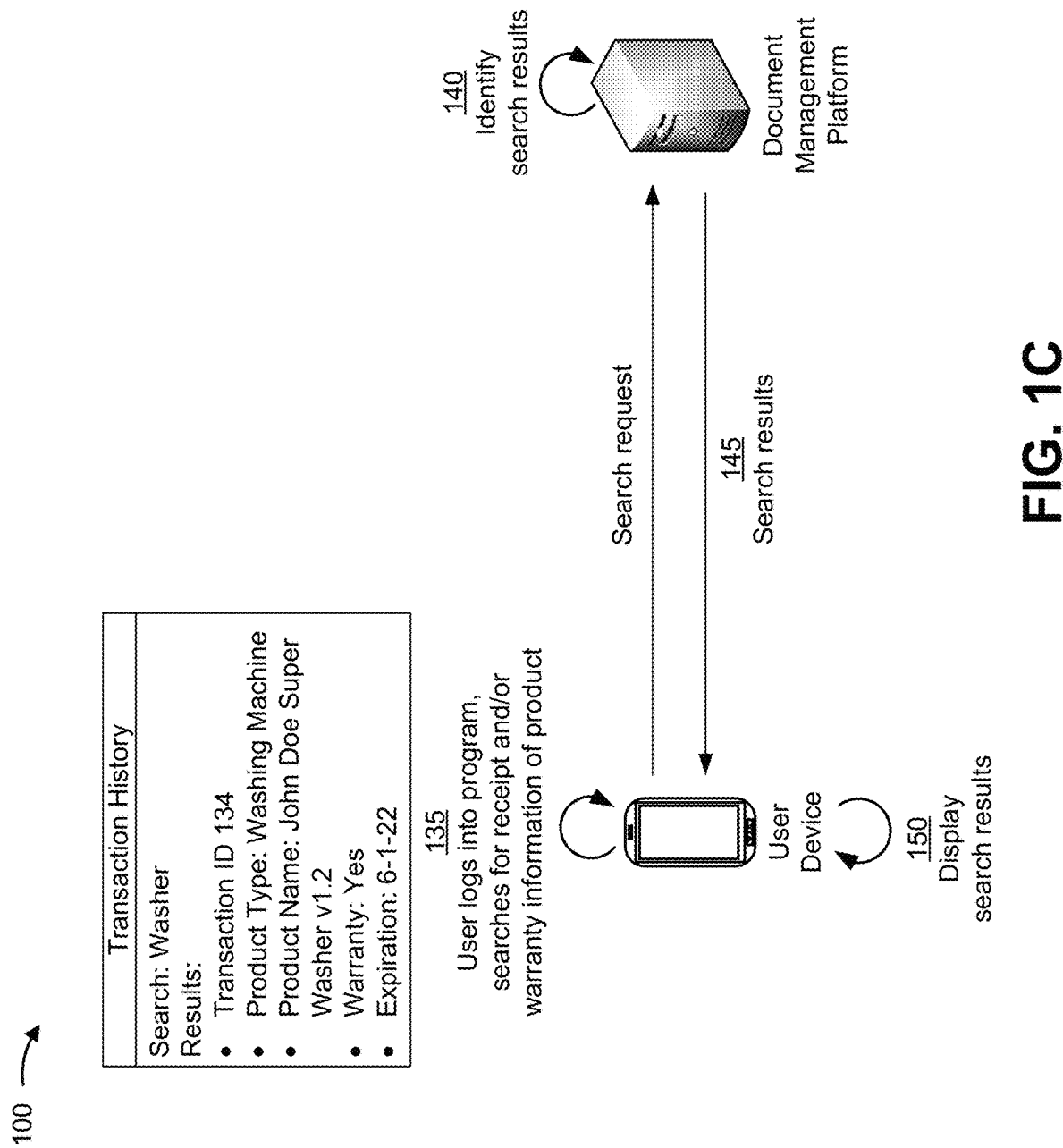

As shown in FIG. 1C, the user may use a search feature of the program to look up warranty information for the warranty of the product and/or may look up the electronic receipt of the transaction. For example, and as shown by reference number 135, the user may interact with the user device to log into the program and may input search terms to search for the electronic receipt and/or the warranty information. The search terms may include a merchant name, a product name, a product type, a transaction date, and/or the like. When the user submits the search, a search request that includes the search terms may be provided to the document management platform.

As shown by reference number 140, the document management platform may identify search results. For example, the document management platform may reference the data structure to identify the search results. In this case, the document management platform may use the search terms as part of a search query to identify one or more tags that match the search terms or that satisfy a threshold level of similarity with the search terms. Additionally, the search request may specify a type of information being requested, such as warranty information (e.g., indicating the terms of the warranty), the electronic receipt, and/or the like. This may allow the document management platform to identify the type of information being requested.

As shown by reference number 145, the document management platform may provide the search results to the user device. As shown by reference number 150, the user device may display the search results. For example, the search results may be displayed as part of an interface of the program or the website. In the depicted example, the user may input the term Washer into the search feature. This may cause the search results to display a transaction identifier for a transaction (shown as Transaction Identifier 134), a product type (shown as Washing Machine), a product name (shown as John Doe Super Washer v1.2), an indication of whether the product has a warranty (shown as Yes), a warranty expiration date (shown as Jun. 1, 2022), and/or the like.

In some implementations, the user may be able to download one or more of the search results. For example, the user may download an electronic copy of the receipt of the transaction that may be printed and used as proof of a start date for the warranty of the product.

In this way, the document management platform allows the user to look up the warranty information for the product and/or the electronic receipt of the transaction.

Figure 1D:
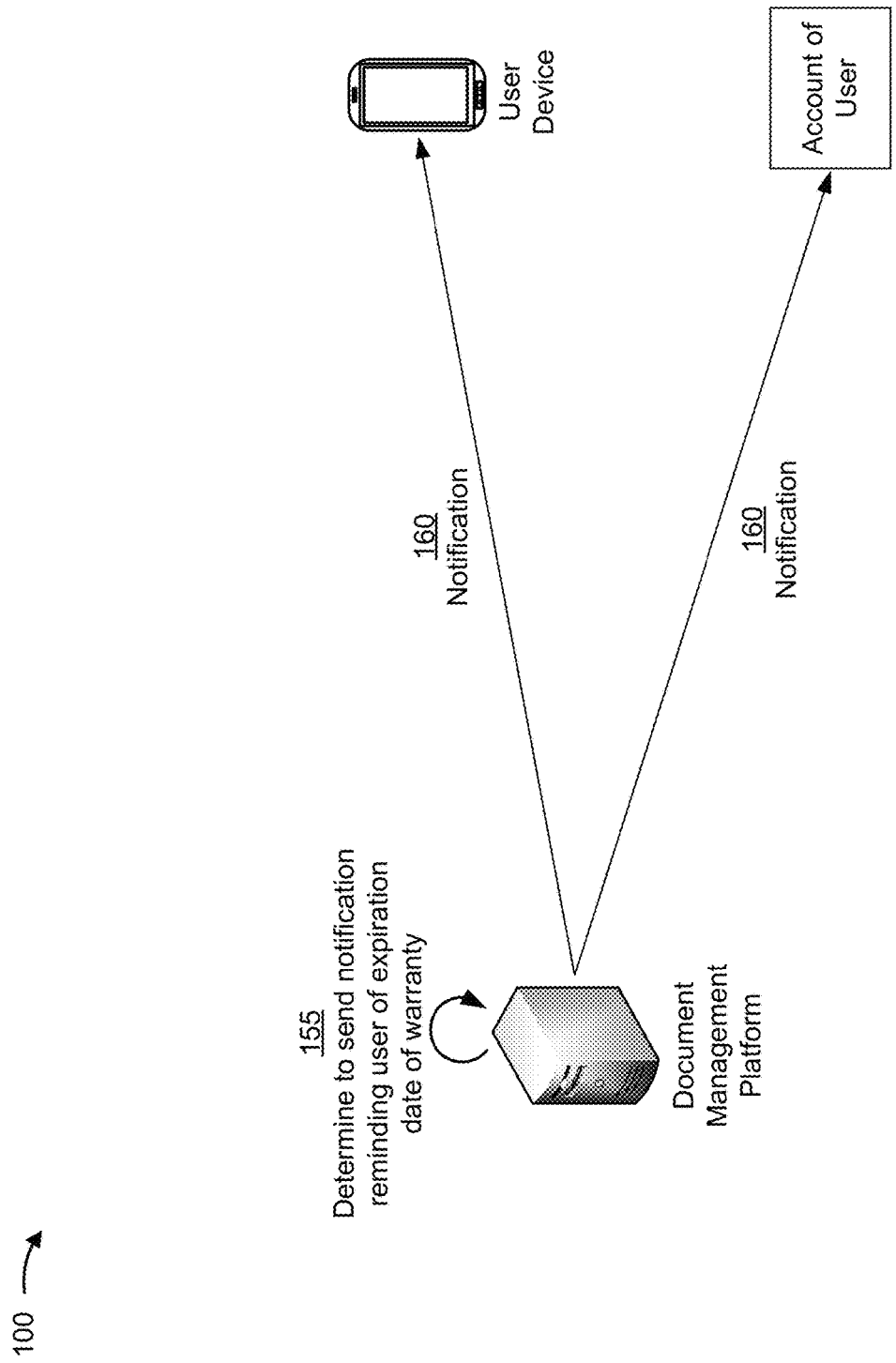

As shown in FIG. 1D, the document management platform may remind the user of the expiration date of the warranty. For example, as shown by reference number 155, the document management platform may determine to send a notification reminding the user of the expiration date of the warranty. In this case, the document management platform may be configured with a rule or threshold value indicating when to provide the user with the reminder of the expiration date of the warranty. The notification may include the expiration date (and/or expected expiration date) of the warranty, information needed to renew the warranty (e.g., contact information needed to renew the warranty, such as a phone number, e-mail address, renewal webpage, and/or the like), information needed to make a claim based on a term of the warranty not being fulfilled (e.g., the electronic copy of the receipt related to the warranty), and/or the like.

As an example, the notification may depend on a timer that, upon expiring or hitting a certain time, causes the document management platform to determine to send the notification. As another example, the document management platform may periodically check a current date and may determine whether the current date is within a threshold time period of the expiration date of the warranty. If the current date is within the threshold time period, the document management platform may determine to send the notification to the user.

As shown by reference number 160, the document management platform may provide the notification to the user. For example, the document management platform may provide the notification to the user device (e.g., via a short message service (SMS), via the program, etc.). As another example, the document management platform may provide the notification to an account associated with the user (e.g., an e-mail account, an account linked to the program, etc.).

In this way, the document management platform performs actions that may help ensure that the user does not forget about the warranty, is able to submit a claim prior to expiration of the warranty, is able to prove that the warranty is in force, is able to renew the warranty in a timely manner, and/or the like.

Figure 1E:
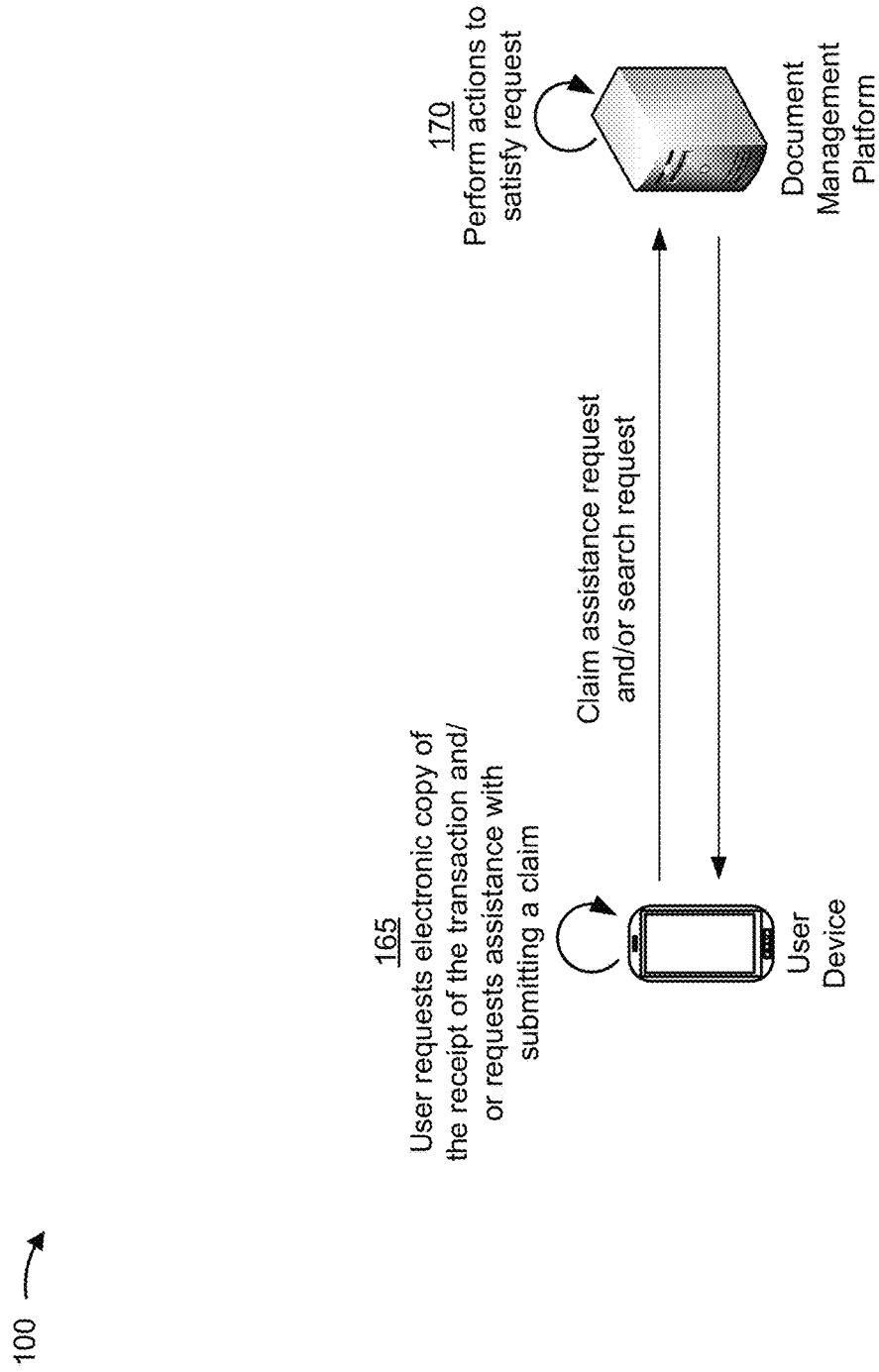

As shown in FIG. 1E, the document management platform may perform actions associated with assisting the user in submitting a claim based on the warranty. For example, and as shown by reference number 165, the user may interact with the user device to request an electronic copy of the receipt (e.g., in order to submit a claim for breach of warranty, to request assistance in submitting the claim for breach of warranty, and/or the like). In some implementations, an original receipt may be saved and may be used when submitting the claim based on the warranty. By saving the original receipt (e.g., the original electronic receipt), and submitting the original receipt, the authenticity of the claim is improved relative to submitting a copy of the receipt. In some cases, one or more security measures may be taken to be ensure that the original receipt is in fact the original receipt.

As shown by reference number 170, the document management platform may perform one or more actions to satisfy the request. For example, assume the user interacts with the program or the website to request the electronic copy of the receipt. In this case, the document management platform may reference the data structure to identify and provide the electronic copy of the receipt for display via an interface of the program or the website. The electronic copy may be downloadable, such that the user is able to manually print out the receipt and use the receipt as evidence, for example, of a start date of the warranty.

In some implementations, the user may interact with the program or the website to request to submit a claim under the terms of the warranty. For example, the program may have an interface directed toward submitting or assisting in pursuing claims covered under the terms of the warranty. In this case, the user may use the search feature of the program or the website to permit the document management platform to identify the electronic receipt. Additionally, the document management platform may identify a manner in which the claim is to be submitted and may perform actions to submit the claim. For example, the document management platform may populate fields of a claim form that is provided via a webpage of a merchant. In this case, the document management platform may populate fields that ask for personal information of the user, product information for the product, proof of warranty (e.g., such as by uploading the electronic receipt), and/or the like.

In some implementations, a merchant may request that the claim be submitted via another mode of communication, such as by mail, e-mail, telephone, and/or the like. In these cases, the document management platform may perform one or more actions to submit the claim or assist the user in submitting the claim. As an example, if the claim is to be submitted via telephone, the document management platform may populate fields of a templated claim form, such that the user may read the claim form aloud during a telephone call. In some cases, such as when the claim submission service is automated, the document management platform may interact with a communication device (e.g., a mobile phone, a smart phone, etc.) to automatically select menu choices needed to submit the claim.

In some implementations (not shown), the document management platform may assist the user in renewing a warranty. For example, the document management platform may automatically populate a renewal form to renew the warranty, prior to the expiration date of the warranty, and may be configured to automatically renew the warranty or to provide the populated renewal form to the user device to be reviewed by the user.

In this way, the document management platform ensures that the user does not forget that the product is covered by the warranty, assists the user in submitting a claim based on the warranty, assists the user in renewing the warranty, and/or the like. Furthermore, the document management platform conserves resources (e.g., processing resources, network resources, memory resources, and/or the like) relative to an inferior platform that is unable to effectively assist the user in managing the warranty of the product.

As indicated above, FIGS. 1A-1E are provided merely as an example. Other examples may differ from what was described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple and/or distributed devices. Additionally, or alternatively, a set of devices (e.g., one or more devices) of example implementation 100 may perform one or more functions described as being performed by another set of devices of example implementation 100.

Figure 2:
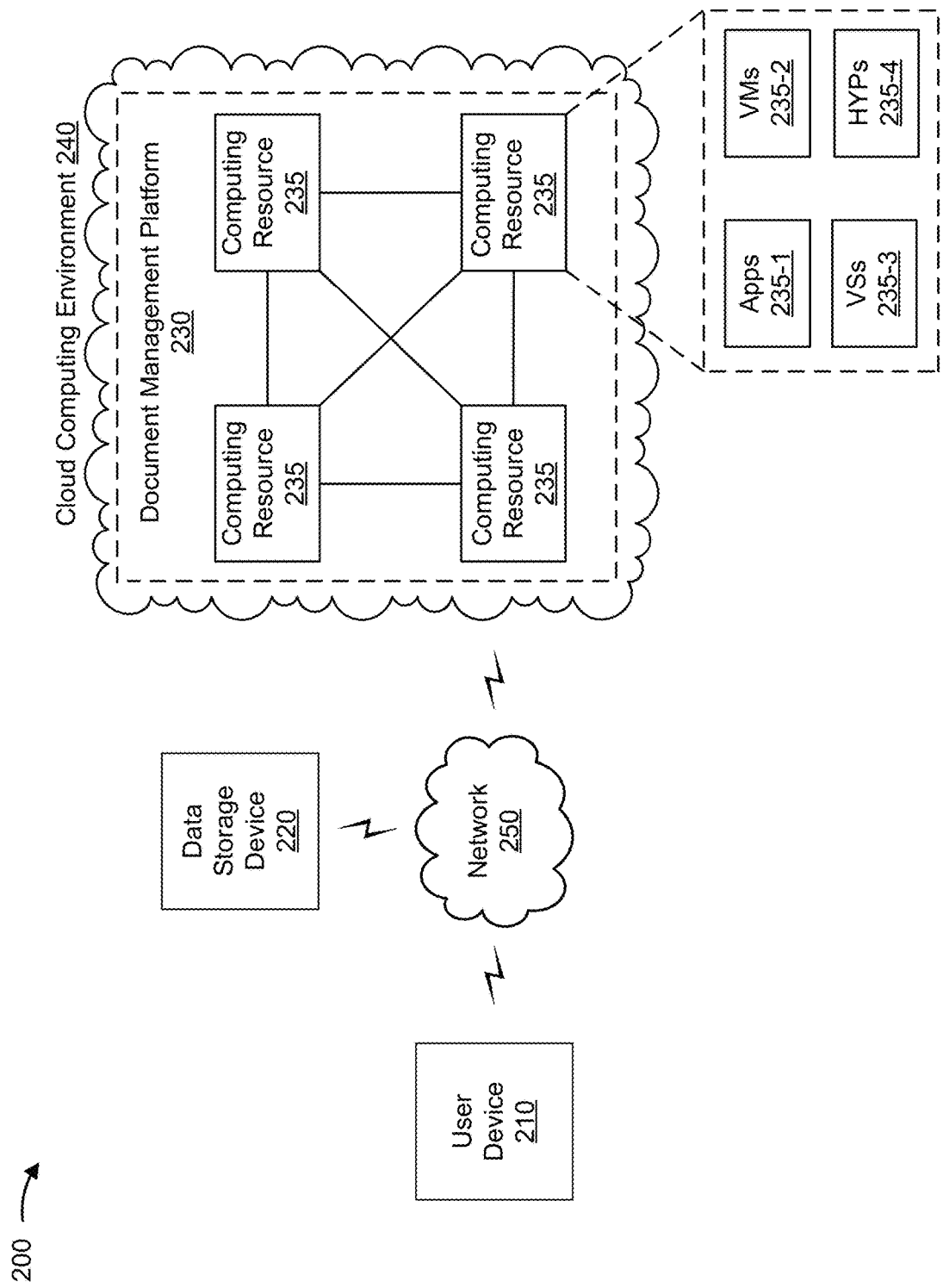
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a data storage device 220, a document management platform hosted within a cloud computing environment 240, and/or a network 250. Devices of environment 200 may interconnect via wired connections, wireless connections, or a combination of wired and wireless connections.

User device 210 includes one or more devices capable of receiving, generating, storing, processing, and/or providing information associated with a transaction for one or more products. For example, user device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 210 may support a program that allows a user to search for transactional information relating to a transaction for one or more products. In some implementations, the program may be a program designed for managing warranties of products. In some implementations, the program may be an online banking program, and may integrate one or more warranty management features in with other aspects of the online banking program. For example, the program may allow a user to view a transaction history, select a transaction, and view and/or download a receipt for the transaction, view an itemized list of products purchased during the transaction, and/or the like.

Data storage device 220 includes one or more devices capable of receiving, storing, generating, determining, and/or providing information associated with a transaction for one or more products. For example, data storage device 220 may include a server device or a group of server devices. In some implementations, a first data storage device 220 may support a data structure that establishes an association between product information for a product, warranty information for a warranty of the product, a set of tags identifying the product, an electronic copy of a receipt of a transaction for the product, and/or an identifier of a record of the transaction. Additionally, or alternatively, the first data storage device 220 (or a second data storage device 220) may store historical data used to train machine learning models, such as historical warranty data, historical search terms data, and/or the like. In some implementations, data storage device 220 may interact with document management platform 230 to provide document management platform 230 with search results to satisfy a search performed by a user via user device 210. In some implementations, data storage device 220 may provide the historical data to document management platform 230.

Document management platform 230 includes one or more devices capable of receiving, storing, generating, determining, and/or providing information associated with a transaction for one or more products. For example, document management platform 230 may include a server device (e.g., a host server, a web server, an application server, etc.), a data center device, or a similar device. In some implementations, document management platform 230 may interact with user device 210 to assist a user in managing a warranty of a product.

In some implementations, as shown, document management platform 230 may be hosted in cloud computing environment 240. Notably, while implementations described herein describe document management platform 230 as being hosted in cloud computing environment 240, in some implementations, document management platform 230 might not be cloud-based (i.e., may be implemented outside of a cloud computing environment) or may be partially cloud-based.

Cloud computing environment 240 includes an environment that hosts document management platform 230. Cloud computing environment 240 may provide computation, software, data access, storage, etc. services that do not require end-user knowledge of a physical location and configuration of system(s) and/or device(s) that hosts document management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host document management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or data storage device 220. Application 235-1 may eliminate a need to install and execute the software applications on these devices. For example, application 235-1 may include software associated with document management platform 230 and/or any other software capable of being provided via cloud computing environment 240. In some implementations, one application 235-1 may send/receive information to/from one or more other applications 235-1, via virtual machine 235-2. In some implementations, application 235-1 may be the program or the website described herein, may support the program or the website described herein, and/or the like.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210 and/or data storage device 220, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
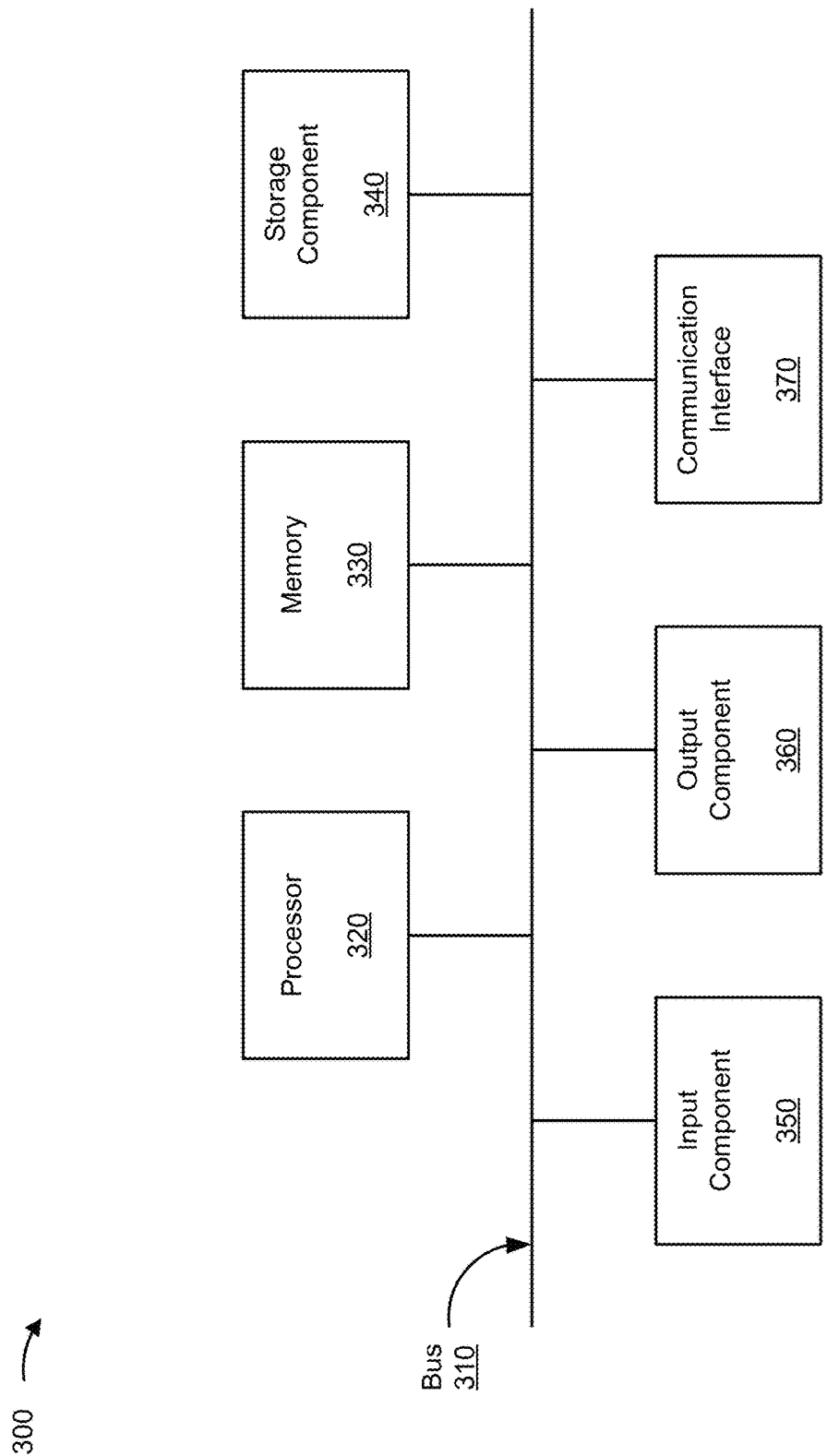
FIG. 3 is a diagram of example components of one or more devices of FIG. 2.

FIG. 3 is a diagram of example components of a device 300. Device 300 may correspond to user device 210, data storage device 220 and/or document management platform 230. In some implementations, user device 210, data storage device 220 and/or document management platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
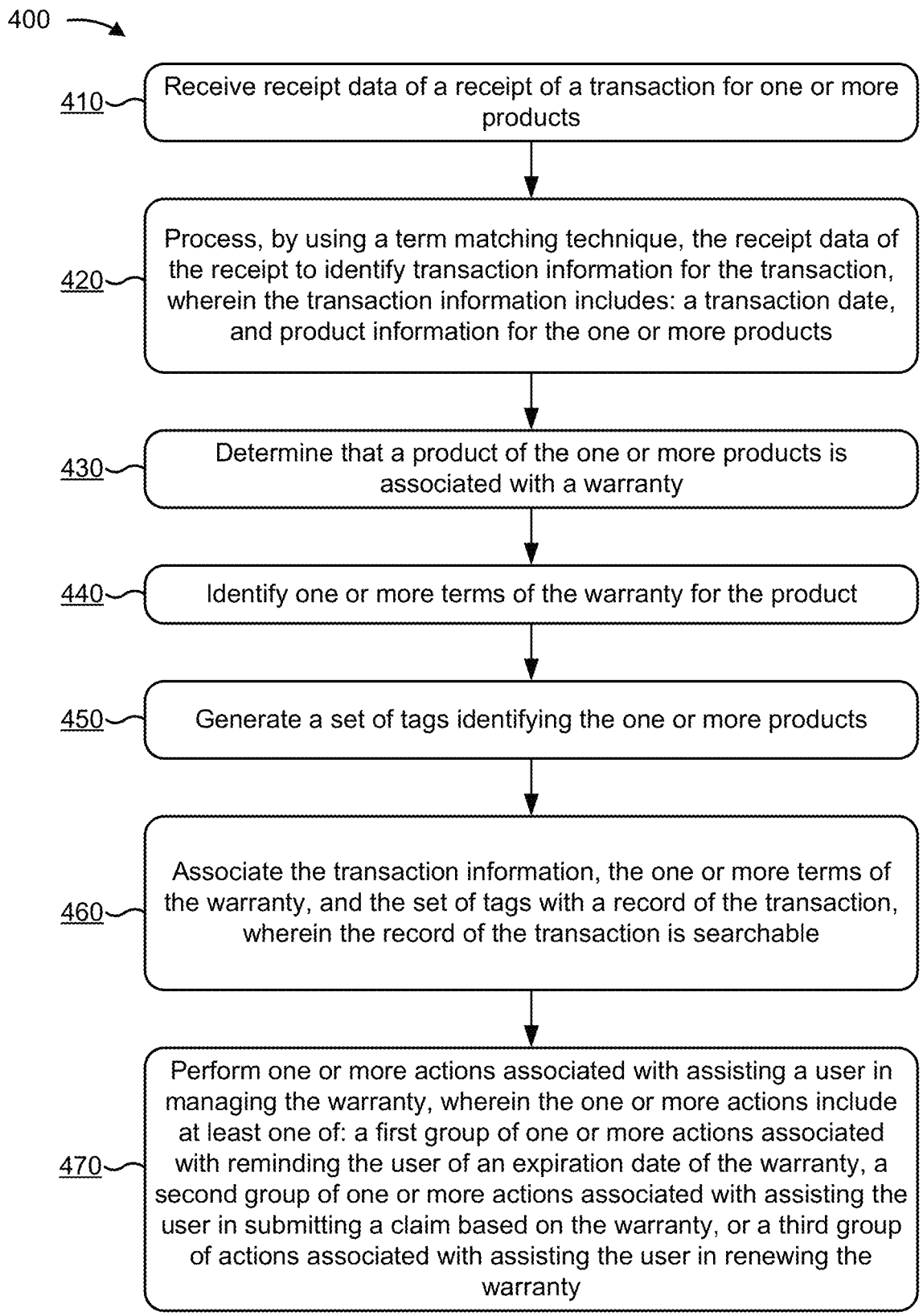
FIGS. 4-6 are flow charts of example process implementations.

FIG. 4 is a flow chart of an example process 400. In some implementations, one or more process blocks of FIG. 4 may be performed by a document management platform (e.g., document management platform 230). In some implementations, one or more process blocks of FIG. 4 may be performed by another device or a group of devices separate from or including the document management platform, such as a user device (e.g., user device 210), a data storage device (e.g., data storage device 220) and/or the like.

As shown in FIG. 4, process 400 may include receiving receipt data of a receipt of a transaction for one or more products (block 410). For example, the document management platform (e.g., using computing resource 235, processor 320, memory 330, storage component 340, input component 350, communication interface 370, and/or the like) may receive receipt data of a receipt of a transaction for one or more products, as described above in connection with FIGS. 1A-1E.

As further shown in FIG. 4, process 400 may include processing, by using a term matching technique, the receipt data of the receipt to identify transaction information for the transaction, wherein the transaction information includes a transaction date, and product information for the one or more products (block 420). For example, the document management platform (e.g., using computing resource 235, processor 320, memory 330, storage component 340, and/or the like) may process, by using a term matching technique, the receipt data of the receipt to identify transaction information for the transaction, as described above in connection with FIGS. 1A-1E. In some implementations, the transaction information may include a transaction date, and product information for the one or more products.

As further shown in FIG. 4, process 400 may include determining that a product of the one or more products is associated with a warranty (block 430). For example, the document management platform (e.g., using computing resource 235, processor 320, memory 330, storage component 340, and/or the like) may determine that a product of the one or more products is associated with a warranty, as described above in connection with FIGS. 1A-1E.

As further shown in FIG. 4, process 400 may include identifying one or more terms of the warranty for the product (block 440). For example, the document management platform (e.g., using computing resource 235, processor 320, memory 330, storage component 340, and/or the like) may identify one or more terms of the warranty for the product, as described above in connection with FIGS. 1A-1E.

As further shown in FIG. 4, process 400 may include generating a set of tags identifying the one or more products (block 450). For example, the document management platform (e.g., using computing resource 235, processor 320, memory 330, storage component 340, and/or the like) may generate a set of tags identifying the one or more products, as described above in connection with FIGS. 1A-1E.

As further shown in FIG. 4, process 400 may include associating the transaction information, the one or more terms of the warranty, and the set of tags with a record of the transaction, wherein the record of the transaction is searchable (block 460). For example, the document management platform (e.g., using computing resource 235, processor 320, memory 330, storage component 340, and/or the like) may associate the product information, the one or more terms of the warranty, and/or the set of tags with a record of the transaction, as described above in connection with FIGS. 1A-1E. In some implementations, the record of the transaction may be accessible via a program that includes a search feature that allows the user to search for the receipt or for the one or more terms of the warranty.

As further shown in FIG. 4, process 400 may include performing one or more actions associated with assisting a user in managing the warranty, wherein the one or more actions include at least one of: a first group of one or more actions associated with reminding the user of an expiration date of the warranty, a second group of one or more actions associated with assisting the user in submitting a claim based on the warranty, or a third group of actions associated with assisting the user in renewing the warranty (block 470). For example, the document management platform (e.g., using computing resource 235, processor 320, memory 330, storage component 340, input component 350, output component 360, communication interface 370, and/or the like) may perform one or more actions associated with assisting the user in managing the warranty, as described above in connection with FIGS. 1A-1E. In some implementations, the one or more actions may include at least one of: a first group of one or more actions associated with reminding the user of an expiration date of the warranty, a second group of one or more actions associated with assisting the user in submitting a claim based on the warranty, or a third group of actions associated with assisting the user in renewing the warranty.

Process 400 may include additional implementations, such as any single implementation or any combination of implementations described below and/or in connection with one or more other processes described elsewhere herein.

In some implementations, when receiving the receipt data of the receipt of the transaction, the document management platform may receive, from a user device, image data of the receipt of the transaction. Additionally, the document management platform may convert, using a character recognition technique, the image data to text data, where the text data is capable of being processed by the term matching technique.

In some implementations, when determining that the product of the one or more products is associated with the warranty, the document management platform may identify a merchant associated with the transaction. The merchant may be a manufacturer of the product or a retailer. In some implementations, the document management platform may use a semantic engine parser to analyze a website (e.g., of the merchant) to determine that the warranty is automatically provided upon purchasing the product. In some cases, the document management platform may determine that the user purchased the product from the merchant whose website is being checked. In some cases, the document management platform may determine that the user purchased the product from a first merchant (e.g., a retail provider) and may check a web site of a second merchant (e.g., a manufacturer).

In some implementations, when identifying the one or more terms of the warranty, the document management platform may identify a merchant associated with the transaction and may identify the one or more terms of the warranty by using a semantic engine parser to analyze a website of the merchant that describes the one or more terms of the warranty. The merchant may be a manufacturer of the product or a retailer. In some implementations, when generating the set of tags, the document management platform may generate a first subset of tags, of the set of tags, that identify names of the one or more products, a second subset of tags, of the set of tags, that identify descriptors of the one or more products, and a third subset of tags, of the set of tags, that identify variants of the names of the one or more products or the descriptors of the one or more products.

In some implementations, when performing the one or more actions, the document management platform may determine, as part of the first group of one or more actions, that a current date is within a threshold time period of the expiration date of the warranty. In some implementations, the document management platform may provide, as part of the first group of one or more actions and to a user device associated with the user, a notification reminding the user of the expiration date of the warranty.

In some implementations, when associating the transaction information, the one or more terms of the warranty, and the set of tags with the record of the transaction, the document management platform may associate an electronic copy of the receipt of the transaction with the record of the transaction. Additionally, the document management platform may receive, from a user device that is using a search feature of a program or a website, a request for the electronic copy of the receipt of the transaction. In some implementations, when performing the one or more actions, the document management platform may identify, as part of the second group of one or more actions, the record of the transaction based on search terms included in the request. In some implementations, the document management platform may identify, as part of the second group of one or more actions, the electronic copy of the receipt of the transaction that was associated with the record of the transaction. In some implementations, the document management platform may provide, to the user device and as part of the second group of one or more actions, the electronic copy of the receipt of the transaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
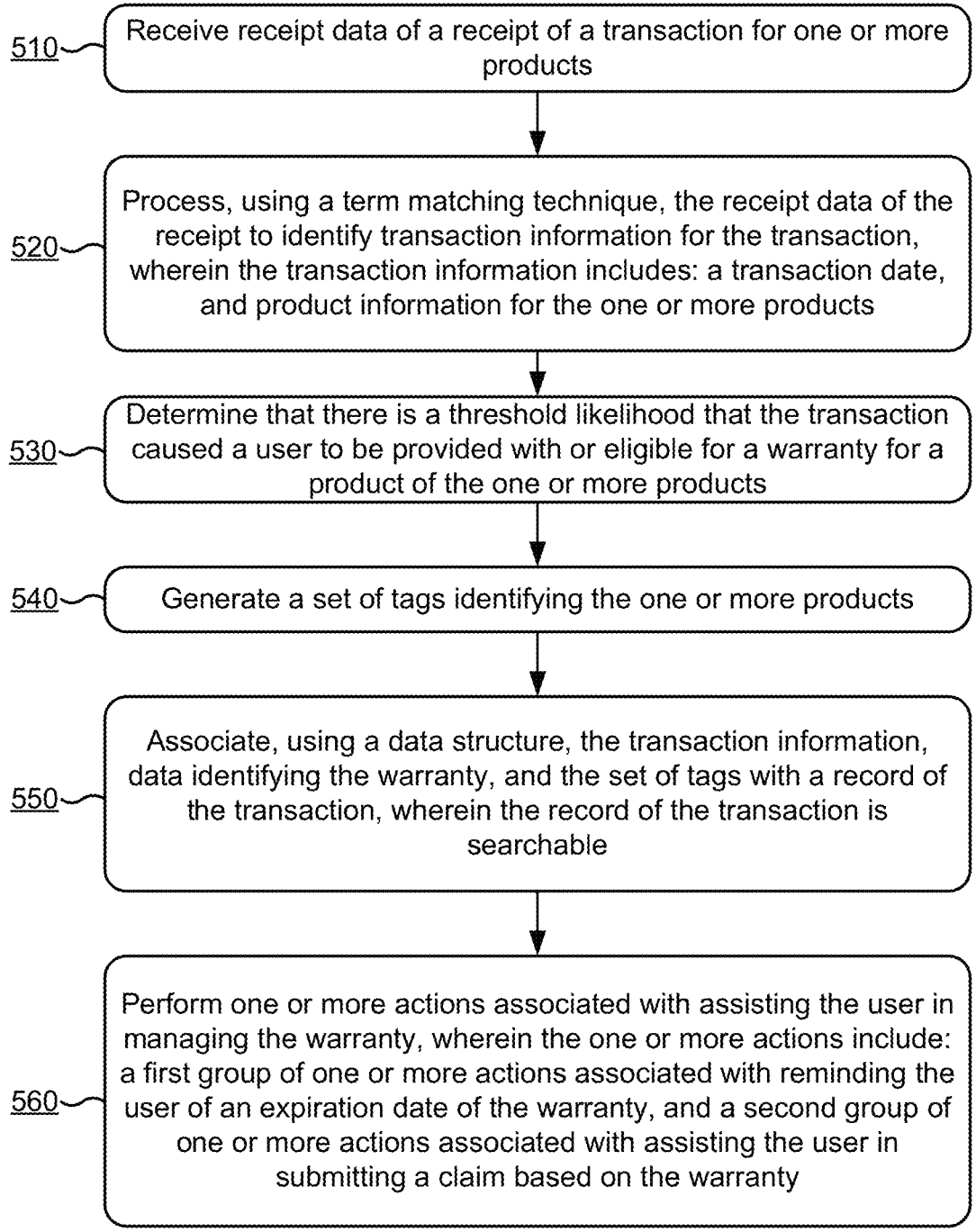

FIG. 5 is a flow chart of an example process 500. In some implementations, one or more process blocks of FIG. 5 may be performed by a document management platform (e.g., document management platform 230). In some implementations, one or more process blocks of FIG. 5 may be performed by another device or a group of devices separate from or including the document management platform, such as a user device (e.g., user device 210), a data storage device (e.g., data storage device 220) and/or the like.

As shown in FIG. 5, process 500 may include receiving receipt data of a receipt of a transaction for one or more products (block 510). For example, the document management platform (e.g., using computing resource 235, processor 320, memory 330, storage component 340, input component 350, communication interface 370, and/or the like) may receive receipt data of a receipt of a transaction for one or more products, as described above in connection with FIGS. 1A-1E. As used in connection with FIG. 5, "terms" may refer to one or more terms which may include all terms of a warranty or a subset of all of the terms of the warranty.

As further shown in FIG. 5, process 500 may include processing, using a term matching technique, the receipt data of the receipt to identify transaction information for the transaction, wherein the transaction information includes a transaction date, and product information for the one or more products (block 520). For example, the document management platform (e.g., using computing resource 235, processor 320, memory 330, storage component 340, and/or the like) may process, using a term matching technique, the receipt data of the receipt to identify transaction information for the transaction, as described above in connection with FIGS. 1A-1E. In some implementations, the transaction information may include a transaction date, and product information for the one or more products.

As further shown in FIG. 5, process 500 may include determining that there is a threshold likelihood that the transaction caused a user to be covered by or eligible for a warranty for a product of the one or more products (block 530). For example, the document management platform (e.g., using computing resource 235, processor 320, memory 330, storage component 340, and/or the like) may determine that there is a threshold likelihood that the transaction caused a user to be covered by or eligible for a warranty for a product of the one or more products, as described above in connection with FIGS. 1A-1E.

As further shown in FIG. 5, process 500 may include generating a set of tags identifying the one or more products (block 540). For example, the document management platform (e.g., using computing resource 235, processor 320, memory 330, storage component 340, and/or the like) may generate a set of tags identifying the one or more products, as described above in connection with FIGS. 1A-1E.

As further shown in FIG. 5, process 500 may include associating, using a data structure, the product information, data identifying the warranty, and the set of tags with a record of the transaction, wherein the record of the transaction is searchable (block 550). For example, the document management platform (e.g., using computing resource 235, processor 320, memory 330, storage component 340, and/or the like) may associate, using a data structure, the product information, data identifying the warranty, and the set of tags with a record of the transaction, as described above in connection with FIGS. 1A-1E. In some implementations, the record of the transaction may be accessible via a program that allows the user to search for the receipt or for terms of the warranty.

As further shown in FIG. 5, process 500 may include performing one or more actions associated with assisting the user in managing the warranty, wherein the one or more actions include a first group of one or more actions associated with reminding the user of an expiration date of the warranty, and a second group of one or more actions associated with assisting the user in submitting a claim based on the warranty (block 560). For example, the document management platform (e.g., using computing resource 235, processor 320, memory 330, storage component 340, input component 350, output component 360, and/or the like) may perform one or more actions associated with assisting the user in managing the warranty, as described above in connection with FIGS. 1A-1E. In some implementations, the one or more actions may include a first group of one or more actions associated with reminding the user of an expiration date of the warranty, and a second group of one or more actions associated with assisting the user in submitting a claim based on the warranty.

Process 500 may include additional implementations, such as any single implementation or any combination of implementations described below and/or in connection with one or more other processes described elsewhere herein.

In some implementations, the document management platform may monitor a transaction history of an account associated with the user to identify the transaction. In some implementations, the document management platform may provide a request for electronic mail data associated with an electronic mail account of the user. In some implementations, when receiving the receipt data, the document management platform may receive, as a response to the request, the electronic mail data associated with the electronic mail account of the user. The electronic mail data may include the receipt data. In some implementations, the document management platform may process the electronic mail data to identify the receipt data.

In some implementations, when determining that the transaction caused the user to be covered by the warranty, the document management platform may determine that the product information does not indicate whether the user was covered by the warranty for the product. In some implementations, the document management platform may provide, to a user device associated with the user, a request message asking the user whether the user received the warranty for the product. In some implementations, the document management platform may receive, from the user device, a response message indicating that the user received the warranty for the product. The response message may include the terms of the warranty.

In some implementations, the document management platform may predict the terms of the warranty using a data model that has been trained on historical warranty data and that uses one or more machine learning techniques. In some implementations, when generating the set of tags, the document management platform may predict, using a data model that has been trained on historical warranty data and that uses one or more machine learning techniques, a set of search terms that the user is likely to use when searching for the receipt or for the terms of the warranty, and may use the set of search terms to generate the set of tags identifying the one or more products.

In some implementations, when performing the one or more actions, the document management platform may determine, as part of the first group of one or more actions, that a current date is within a threshold time period of the expiration date of the warranty, and may automatically renew the warranty based on determining that the current date is within the threshold time period of the expiration date of the warranty.

In some implementations, when associating the transaction information, the data identifying the warranty, and the set of tags with the record of the transaction, the document management platform may associate an electronic copy of the receipt of the transaction with the record of the transaction. In some implementations, when performing the one or more actions, the document management platform may use, as part of the second group of one or more actions, the electronic copy of the receipt of the transaction as part of the claim.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
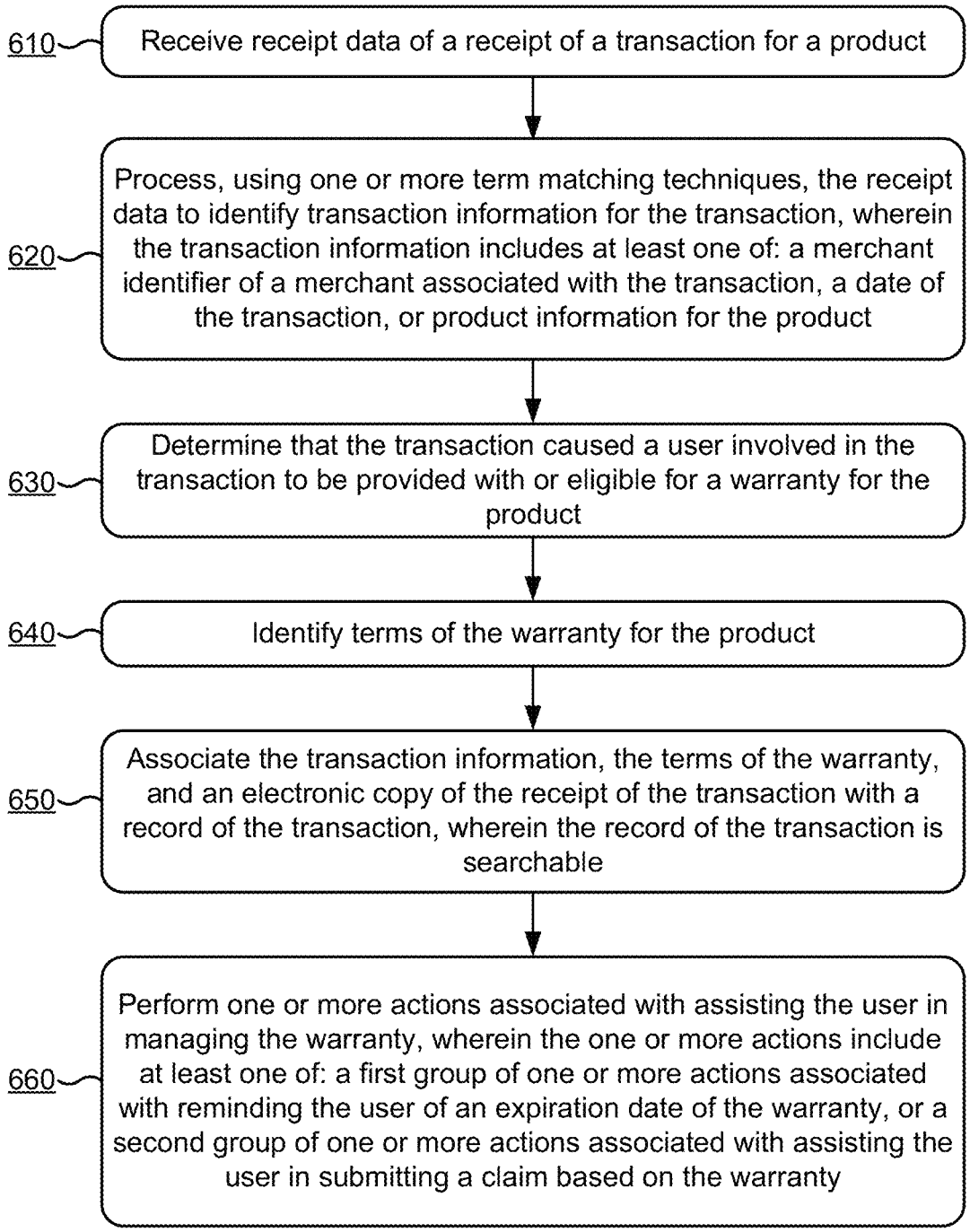

FIG. 6 is a flow chart of an example process 600. In some implementations, one or more process blocks of FIG. 6 may be performed by a document management platform (e.g., document management platform 230). In some implementations, one or more process blocks of FIG. 6 may be performed by another device or a group of devices separate from or including the document management platform, such as a user device (e.g., user device 210), a data storage device (e.g., data storage device 220) and/or the like. As used in connection with FIG. 6, "terms" may refer to one or more terms which may include all terms of a warranty or a subset of all of the terms of the warranty.

As shown in FIG. 6, process 600 may include receiving receipt data of a receipt of a transaction for a product (block 610). For example, the document management platform (e.g., using computing resource 235, processor 320, memory 330, storage component 340, input component 350, communication interface 370, and/or the like) may receive receipt data of a receipt of a transaction for a product, as described above in connection with FIGS. 1A-1E.

As further shown in FIG. 6, process 600 may include processing, using one or more term matching techniques, the receipt data to identify transaction information for the transaction, wherein the transaction information includes at least one of: a merchant identifier of a merchant associated with the transaction, a date of the transaction, or product information for the product (block 620). For example, the document management platform (e.g., using computing resource 235, processor 320, memory 330, storage component 340, and/or the like) may process, using one or more term matching techniques, the data to identify transaction information for the transaction, as described above in connection with FIGS. 1A-1E. In some implementations, the transaction information may include at least one of: a merchant identifier of a merchant associated with the transaction, a date of the transaction, or product information for the product.

As further shown in FIG. 6, process 600 may include determining that the transaction caused a user involved in the transaction to be covered by or eligible for a warranty for the product (block 630). For example, the document management platform (e.g., using computing resource 235, processor 320, memory 330, storage component 340, and/or the like) may determine that the transaction caused a user involved in the transaction to be covered by a warranty for the product, as described above in connection with FIGS. 1A-1E.

As further shown in FIG. 6, process 600 may include identifying terms of the warranty for the product (block 640). For example, the document management platform (e.g., using computing resource 235, processor 320, memory 330, storage component 340, and/or the like) may identify terms of the warranty for the product, as described above in connection with FIGS. 1A-1E.

As further shown in FIG. 6, process 600 may include associating the transaction information, the terms of the warranty, and an electronic copy of the receipt of the transaction with a record of the transaction, wherein the record of the transaction is searchable (block 650). For example, the document management platform (e.g., using computing resource 235, processor 320, memory 330, storage component 340, and/or the like) may associate the product information, the terms of the warranty, and an electronic copy of the receipt of the transaction with a record of the transaction, as described above in connection with FIGS. 1A-1E. In some implementations, the record of the transaction may be accessible via a program that includes a search feature to search for the receipt or for the terms of the warranty.

As further shown in FIG. 6, process 600 may include performing one or more actions associated with assisting the user in managing the warranty, wherein the one or more actions include at least one of: a first group of one or more actions associated with reminding the user of an expiration date of the warranty, or a second group of one or more actions associated with assisting the user in submitting a claim based on the warranty (block 660). For example, the document management platform (e.g., using computing resource 235, processor 320, memory 330, storage component 340, input component 350, output component 360, communication interface 370, and/or the like) may perform one or more actions associated with assisting the user in managing the warranty, as described above in connection with FIGS. 1A-1E. In some implementations, the one or more actions may include at least one of: a first group of one or more actions associated with reminding the user of an expiration date of the warranty, or a second group of one or more actions associated with assisting the user in submitting a claim based on the warranty.

Process 600 may include additional implementations, such as any single implementation or any combination of implementations described below and/or in connection with one or more other processes described elsewhere herein.

In some implementations, the document management platform may generate, after identifying the product information, a set of tags identifying the product, and, when associating the product information and the terms of the warranty with the record of the transaction, the document management platform may associate the product information, the terms of the warranty, and the set of tags with the record of the transaction.

In some implementations, when receiving the receipt data of the receipt of the transaction, the document management platform may receive, from a user device, image data of the receipt of the transaction. In some implementations, the document management platform may convert the image data to a format capable of being processed by the one or more term matching techniques.

In some implementations, when identifying the terms of the warranty, the document management platform may identify the terms of the warranty by using a semantic engine parser to analyze a website of the merchant that describes the terms of the warranty. The terms may include a term identifying the expiration date of the warranty, and the term may be used when performing the first group of one or more actions associated with reminding the user of the expiration date of the warranty.

In some implementations, when performing the one or more actions, the document management platform may determine, as part of the first group of one or more actions, that a current date is within a threshold time period of the expiration date of the warranty. In some implementations, the document management platform may automatically populate a form to renew the warranty based on determining that the current date is within the threshold time period of the expiration date of the warranty. In some implementations, the document management platform may provide the form that has been populated to a user device associated with the user to permit the user to renew the warranty.

In some implementations, the document management platform may receive, from a user device that is using a search feature of a program or a web site, a request for the receipt of the transaction. Additionally, when performing the one or more actions, the document management platform may identify, as part of the second group of one or more actions, the record of the transaction based on search terms included in the request. In some implementations, the document management platform may identify, as part of the second group of one or more actions, the electronic copy of the receipt of the transaction after identifying the record of the transaction. In some implementations, the document management platform may provide, to the user device and as part of the second group of one or more actions, the electronic copy of the receipt of the transaction.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some embodiments described herein may refer to receiving, processing, generating, and/or providing personal information of users. It should be understood that any use of the personal information may be subject to consent of the users and will be used in a manner that is compliant with applicable laws concerning protection and/or use of personal information.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of example implementations. In fact, many of these features may be combined in ways not specifically recited in the claims and/or disclosed in the specification. Although each dependent claim listed below may directly depend on only one claim, the disclosure of example implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, receipt data of a receipt of a transaction for one or more products, the receipt data to include a transaction date;
   identifying, by the device, the transaction date by comparing the receipt data to a template that includes values commonly found in dates;
   training, by the device, a data model that uses one or more machine learning techniques,
      the data model being trained with historical warranty data including information regarding a correspondence between a plurality of products, including the one or more products, and a plurality of warranties;
   determining, by the device, that a threshold likelihood that the transaction caused a user to be covered by or eligible for a warranty for a product of the one or more products is satisfied,
   determining the threshold likelihood is satisfied comprising:
      determining, using the data model, that the threshold likelihood is satisfied based on a confidence level indicating that the warranty is associated with the product,
         the data model to:
            receive as input the receipt data, and
            output one or more indicator values to provide an indication of the confidence level;
   determining, by the device, the warranty for the product based on determining that the threshold likelihood is satisfied;
   identifying, by the device and by a semantic engine parser, one or more terms of the warranty for the product from a website associated with the transaction that describes the one or more terms of the warranty;
   generating, by the device, a set of tags identifying the one or more products;
   associating, by the device, the one or more terms of the warranty and the set of tags with a record of the transaction; and
   sending, by the device, a notification to remind the user of an expiration date of the warranty.

2. The method of claim 1, wherein receiving the receipt data comprises:
   using a secure access delegation service to access a set of e-mails associated with an e-mail account of the user;
   analyzing the set of e-mails to identify the receipt of the transaction; and
   obtaining the receipt of the transaction.

3. The method of claim 1, wherein the one or more terms of the warranty are identified using:
   a character recognition technique, or
   a term matching technique.

4. The method of claim 1, further comprising:
   predicting, using the data model, a set of search terms that the user is likely to use when searching for the one or more terms of the warranty, and
   using the set of search terms to generate the set of tags.

5. The method of claim 1, wherein associating the one or more terms of the warranty and the set of tags with the record of the transaction comprises:
   using a data structure to establish an association between the one or more terms of the warranty, the set of tags, the receipt, and a transaction identifier used to create the record of the transaction.

6. The method of claim 1, wherein generating the set of tags comprises:
   generating the set of tags based on mapping one or more synonyms to a name of the product.

7. A device, comprising:
   one or more memories; and
   one or more processors, operatively coupled to the one or more memories, to:
      receive receipt data of a receipt of a transaction for one or more products, the receipt data to include a transaction date;
      identify the transaction date by comparing the receipt data to a template that includes values commonly found in dates;
      train a data model that uses one or more machine learning techniques, the data model being trained with historical warranty data including information regarding a correspondence between a plurality of products, including the one or more products, and a plurality of warranties;
determine that a threshold likelihood that the transaction caused a user to be covered by or eligible for a warranty for a product of the one or more products is satisfied,
where the one or more processors, when determining the threshold likelihood is satisfied, are to:
determine, using the data model, that the threshold likelihood is satisfied based on a confidence level indicating that the warranty is associated with the product,
the data model to:
receive as input the receipt data, and
output one or more indicator values to provide an indication of the confidence level;
determine the warranty for the product based on determining that the threshold likelihood is satisfied;
identify, by a semantic engine parser, one or more terms of the warranty for the product from a website associated with the transaction that describes the one or more terms of the warranty;
generate a set of tags identifying the one or more products;
associate the one or more terms of the warranty and the set of tags with a record of the transaction; and
send a notification of an expiration date of the warranty.

8. The device of claim 7, wherein the one or more processors, when receiving the receipt data, are to:
monitor a transaction history associated with an account of the user;
identify a change to the transaction history; and
use a secure access delegation service to access the receipt of the transaction.

9. The device of claim 7, wherein the one or more processors, when sending the notification of the expiration date of the warranty, are to:
send the notification if a current date is within a threshold time period of the expiration date of the warranty.

10. The device of claim 7, wherein the one or more processors are further to:
predict, using the data model, a set of search terms that the user is likely to use when searching for the one or more terms of the warranty, and
use the set of search terms to generate the set of tags.

11. The device of claim 7, wherein the one or more processors, when associating the one or more terms of the warranty and the set of tags with the record of the transaction, are to:
use a data structure to establish an association between the one or more terms of the warranty, the set of tags, the receipt, and a transaction identifier used to create the record of the transaction.

12. The device of claim 7, wherein the one or more processors, when generating the set of tags, cause the one or more processors to:
generate the set of tags based on mapping one or more synonyms to a name of the product.

13. The device of claim 7, wherein the notification includes one or more of:
the expiration date of the warranty,
information needed to renew the warranty, or
information needed to make a claim based on a term of the warranty not being fulfilled.

14. A non-transitory computer-readable medium storing one or more instructions, the one or more instructions comprising:
one or more instructions that, when executed by one or more processors, cause the one or more processors to:
receive receipt data of a receipt of a transaction for one or more products, the receipt data to include a transaction date;
identify the transaction date by comparing the receipt data to a template that includes values commonly found in dates;
train a data model that uses one or more machine learning techniques,
the data model being trained with historical warranty data including information regarding a correspondence between a plurality of products and a plurality of warranties;
determine that a threshold likelihood that the transaction caused a user to be covered by or eligible for a warranty for a product of the one or more products, including the one or more products, is satisfied,
where the one or more instructions, that cause the one or more processors to determine the threshold likelihood is satisfied, cause the one or more processors to:
determine, using the data model, that the threshold likelihood is satisfied based on a confidence level indicating that the warranty is associated with the product,
the data model to:
receive as input the receipt data, and
output one or more indicator values to provide an indication of the confidence level;
determine the warranty for the product based on determining that the threshold likelihood is satisfied;
identify, by a semantic engine parser, one or more terms of the warranty for the product from a website associated with the transaction that describes the one or more terms of the warranty;
generate a set of tags identifying the one or more products;
associate the one or more terms of the warranty and the set of tags with a record of the transaction; and
send a notification of an expiration date of the warranty.

15. The non-transitory computer-readable medium of claim 14, wherein the one or more instructions, that cause the one or more processors to generate the set of tags, cause the one or more processors to:
generate the set of tags based on mapping one or more synonyms to a name of the product.

16. The non-transitory computer-readable medium of claim 14, wherein the one or more instructions, that cause the one or more processors to receive the receipt data, cause the one or more processors to:
monitor a transaction history associated with an account of the user;
identify a change to the transaction history; and
use a secure access delegation service to access the receipt of the transaction.

17. The non-transitory computer-readable medium of claim 14, wherein the one or more instructions, that cause the one or more processors to send the notification of the expiration date of the warranty, cause the one or more processors to:
send the notification if a current date is within a threshold time period of the expiration date of the warranty.

18. The non-transitory computer-readable medium of claim 14, wherein the one or more instructions, when executed by the one or more processors, further cause the one or more processors to:
  predict, using the data model, a set of search terms that the user is likely to use when searching for the one or more terms of the warranty, and
  use the set of search terms to generate the set of tags.

19. The non-transitory computer-readable medium of claim 14, wherein the one or more instructions, that cause the one or more processors to associate the one or more terms of the warranty and the set of tags with the record of the transaction, cause the one or more processors to:
  use a data structure to establish an association between the one or more terms of the warranty, the set of tags, the receipt, and a transaction identifier used to create the record of the transaction.

20. The method of claim 1 where receiving the receipt data comprises:
  monitoring a transaction history associated with an account of the user;
  identifying a change to the transaction history; and
  using a secure access delegation service to access the receipt of the transaction.

* * * * *